US007963111B2

(12) United States Patent
Doleh et al.

(10) Patent No.: US 7,963,111 B2
(45) Date of Patent: Jun. 21, 2011

(54) SEA WAVE ENERGY CONVERTER

(76) Inventors: Zakaria Khalil Doleh, Dubai (AE); Rany Zakaria Doleh, Dubai (AE); John Douglas Lock, Dubai (AE)

(*) Notice: Subject to any disclaimer, the term of this patent is extended or adjusted under 35 U.S.C. 154(b) by 590 days.

(21) Appl. No.: 11/794,371

(22) PCT Filed: Nov. 10, 2005

(86) PCT No.: PCT/IB2005/003363
§ 371 (c)(1),
(2), (4) Date: Jun. 28, 2007

(87) PCT Pub. No.: WO2006/051393
PCT Pub. Date: May 18, 2006

(65) Prior Publication Data
US 2009/0278356 A1 Nov. 12, 2009

(51) Int. Cl.
*F03B 17/02* (2006.01)
*F03B 13/18* (2006.01)
*F04B 17/00* (2006.01)
*F04B 35/00* (2006.01)

(52) U.S. Cl. ............... 60/497; 60/495; 290/1 R; 290/42; 290/53; 417/330; 417/332

(58) Field of Classification Search .............. 60/329, 60/392, 393, 487–492, 590, 591, 495–507; 290/42, 53; 417/330–333, 337
See application file for complete search history.

(56) References Cited

U.S. PATENT DOCUMENTS

| 3,970,415 | A | * | 7/1976 | Widecrantz et al. | 417/332 |
| 4,218,192 | A | * | 8/1980 | West | 417/333 |
| 4,355,511 | A | | 10/1982 | Jones | |
| 4,441,316 | A | * | 4/1984 | Moody | 60/398 |
| 4,560,884 | A | * | 12/1985 | Whittecar | 290/42 |
| 4,599,858 | A | * | 7/1986 | La Stella et al. | 60/497 |
| 4,754,157 | A | * | 6/1988 | Windle | 290/53 |
| 4,872,309 | A | * | 10/1989 | Jaenichen, Sr. | 60/497 |
| 4,883,411 | A | * | 11/1989 | Windle | 417/331 |
| 5,177,964 | A | * | 1/1993 | Tanaka et al. | 60/445 |
| 6,109,029 | A | | 8/2000 | Vowles et al. | |
| 6,216,455 | B1 | | 4/2001 | Doleh et al. | |
| 6,812,588 | B1 | * | 11/2004 | Zadig | 290/53 |
| 7,585,131 | B2 | * | 9/2009 | Oigarden et al. | 405/76 |

FOREIGN PATENT DOCUMENTS

| EP | 1007843 B1 | 10/2003 |
| GB | 2 131 887 A | 6/1984 |
| NL | 1015196 C | 2/2002 |
| WO | 02/14687 A1 | 2/2002 |
| WO | 2004/113718 A1 | 12/2004 |
| WO | WO2004/113718 A1 * | 12/2004 |
| WO | WO 2004113718 A1 * | 12/2004 |

* cited by examiner

*Primary Examiner* — Thomas E Denion
*Assistant Examiner* — Christopher Jetton
(74) *Attorney, Agent, or Firm* — The Webb Law Firm

(57) ABSTRACT

The invention relates to a method for generating energy from an undulating movement of a medium such as seawater, comprising of following the movement of the medium, wherein a direction of movement of the movement changes at a point in time, converting the followed movement into energy, interrupting the following of the movement for an interruption period close to the point in time, wherein conversion of energy comprises of pumping a fluid with the followed movement by feeding and discharging said fluid.

10 Claims, 8 Drawing Sheets

Figure 1:
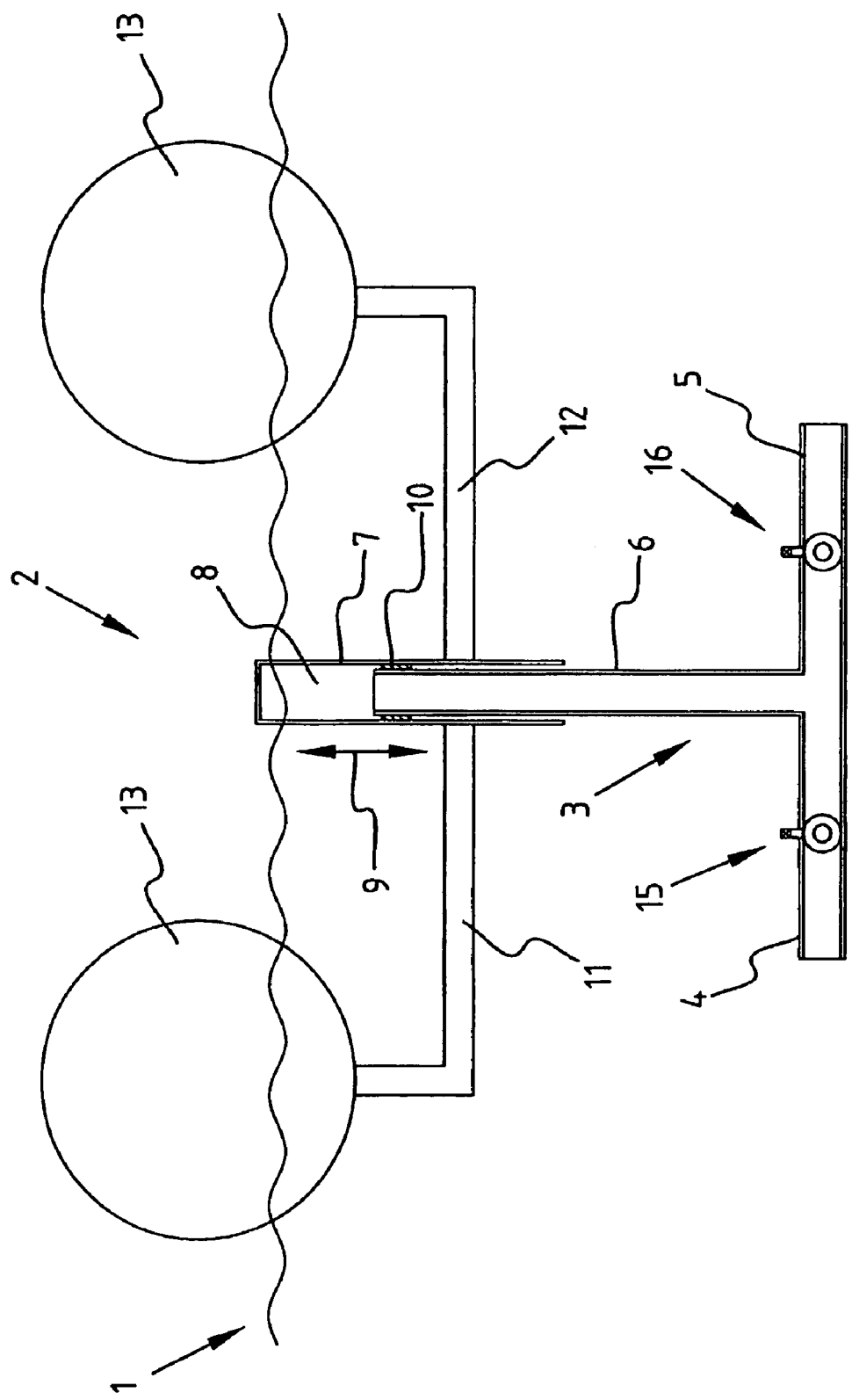

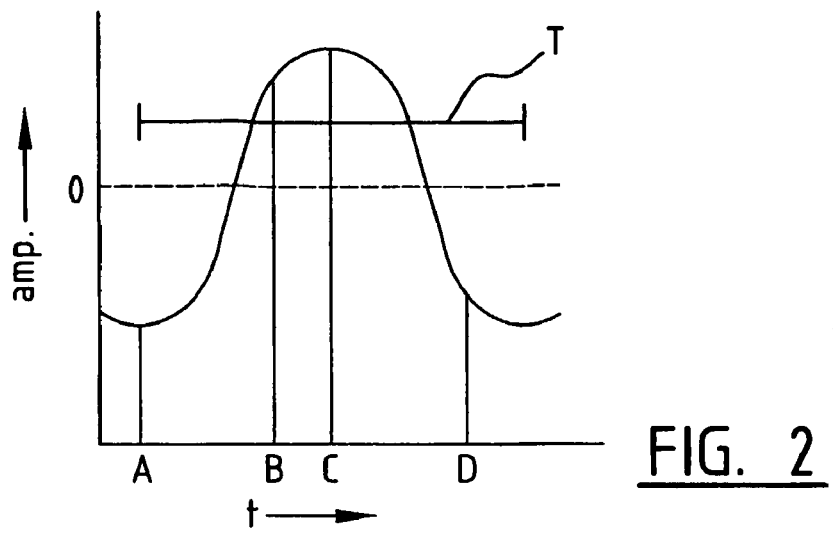
FIG. 2
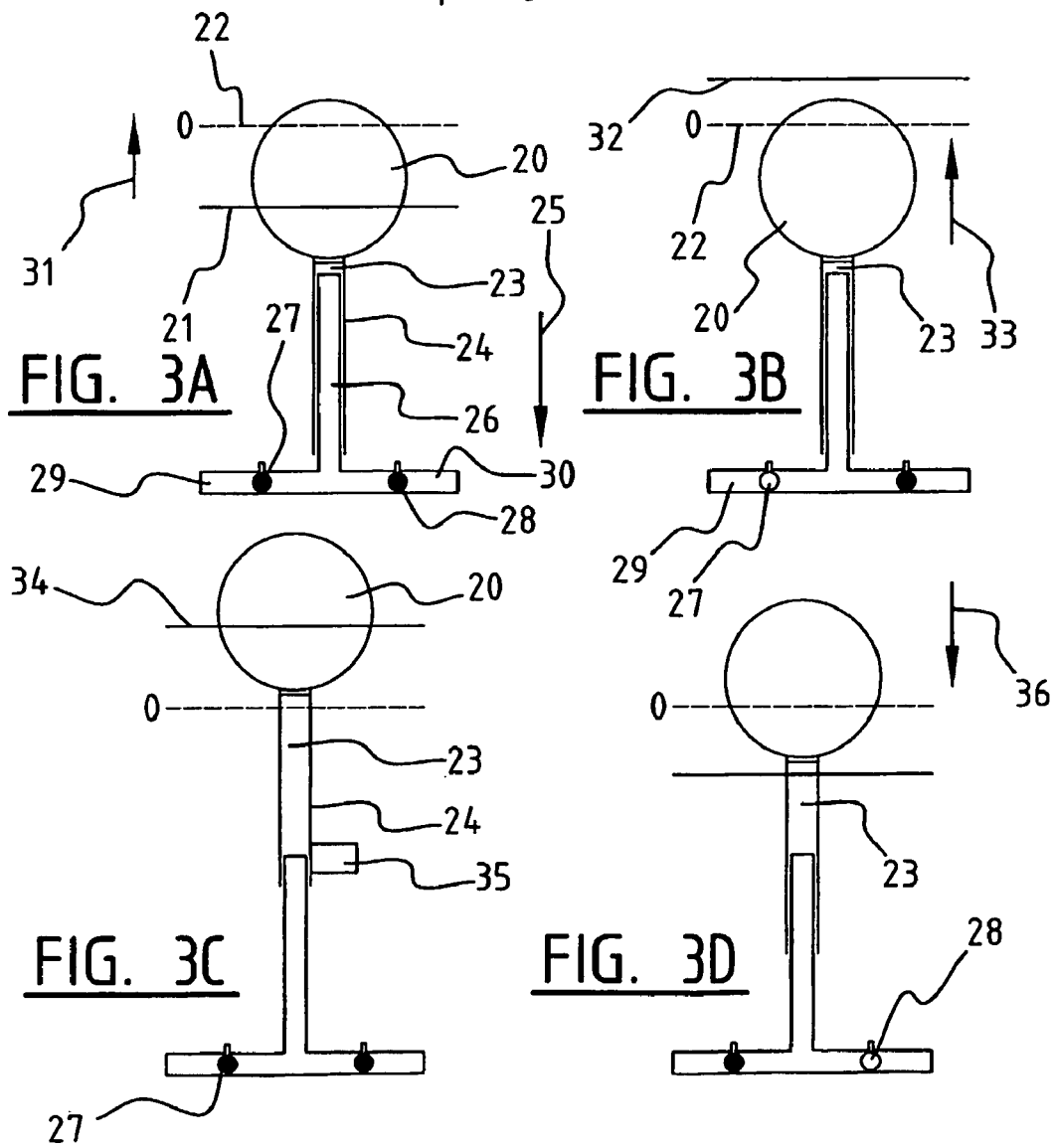
FIG. 3A
FIG. 3B
FIG. 3C
FIG. 3D

SEA WAVE ENERGY CONVERTER

The invention relates to a method for generating energy from an undulating movement of a medium such as seawater, wherein this movement is followed during the movement of the medium, wherein the followed movement is converted into energy, and wherein a direction of movement of the movement changes at a point in time. The invention also relates to a device for generating energy from the movement of a medium such as seawater.

Such devices are known, for instance from EP-A-1007843 and NL 1015196 C. Both applications are incorporated into the present application by means of explicit reference. From the former document it is known to use the substantially vertical movement of seawater for energy generation. A propeller arranged in a hollow body is driven by the undulating movement of the seawater.

A problem of the known devices is the low efficiency of energy conversion. The object of the invention is to provide a device and a method wherein the efficiency of the energy conversion is improved.

U.S. Pat. No. 4,355,511 shows a method for energy conversion of a wave movement wherein a buoyant body is held at a predetermined level below the water surface when the body is floating in a trough of a wave. After a predetermined time the buoyant body is released for a vertical flotational movement, substantially due to the crest of the wave. The resulting extended vertical movement is converted into usable power. The buoyant body is also held a predetermined distance above the water surface until it is over a trough portion, whereafter the body is released for accelerated descent under the influence of gravity such that the body is submerged to a predetermined level under the surface of the wave trough. The means for holding the buoyant body are formed by mechanical, mutually locking means.

The same applies for U.S. Pat. No. 4,599,858, wherein the vertical oscillation of the buoyant body is mechanically altered to at least partially conform to the wave frequency during a period of operation. The braking means for arresting the movement of the buoyant body comprise a brake disc arranged on a shaft, which is driven by co-action of a pinion on the buoyant body and a rack on the shaft.

Finally, GB-A-2 131 887 describes a similar device and method for wave energy conversion, wherein the locking means for locking the floating pontoon construction at determined moments are magnetic locking means.

Mechanical locking of the buoyant body is not recommended as a result of the relatively great forces which act on the mechanical locking means during the holding period. This will result in wear and relatively high maintenance costs.

The object of the invention is to provide another solution for controlling the movement of the buoyant body in response to the wave movement so that the above stated drawbacks are obviated. Another object is to provide an improved method and device for wave energy conversion wherein the efficiency is increased.

This object is achieved with a method according to claim 1.

The movement which normally follows the movement of the medium will fall behind the continuously moving medium. The period of interruption is shorter than the time between two points in time at which the movement of the medium reverses. According to one example, the sea level will become lower while the energy-generating means are held in place in a higher position relative to the falling sea level. After the period of interruption a movement is carried out such that the medium is overtaken. The acceleration occurring here, which will after all proceed more quickly than the movement of the medium during the period of interruption, produces an increased efficiency in energy generation. More work is done in a shorter time. Overtaking of the movement of the medium takes place for instance under the influence of gravity. The acceleration of the medium, being seawater, during the descending movement is never greater than the gravitational acceleration, so this movement can always be overtaken making use of the force of gravity. The followed movement is used to pumping fluid by supplying and discharging the fluid. The fluid can then be pumped to a turbine, or one or more turbines are arranged in the fluid feed and discharge so that energy is hereby generated from the movement of the medium. An interruption of the followed movement can be achieved in advantageous manner by closing the feed and discharge. This hydraulic blocking can be realized in relatively simple manner and at favourable cost.

According to one embodiment, the method comprises of following the movement of the medium with a follower, preferably being or comprising a buoyant body, guiding the follower and interrupting the guided movement of the follower during the interruption. The follower is hereby fixed while the seawater swells further. The follower will here be further submerged in a rising medium, a wave crest, wherein buoyant forces which become increasingly greater are developed on the follower. The buoyant forces will become greater as the quantity of water displaced by the follower becomes increasingly greater. When the interruption ends, this force is used to guide the buoyant body and to generate energy. The increased force and the associated work increase the efficiency.

The interruption of the movement of the buoyant body following the seawater results in particular in an actual movement of the follower which overshoots the normal extreme values of the normally followed movement. Owing to the greater than usual forces being exerted on the follower as a result of the water displacement, the follower can jump out of the medium. A greater height difference is hereby overcome, which results in a higher energy yield. When the wave is 1.0 meter high, the buoyant body can for instance reach a height of up to 1.20 meters.

The descending movement, trough of a wave, starts from the top position of the follower. The interruption begins close to the moment of this top position. When this top position is already higher than the usual position, i.e. the normal crest height of the wave, more energy will be generated during the descending stroke.

The method preferably further comprises of detecting the change in the direction of movement and interrupting in response to the detection. The extreme values of the movement of the medium or the follower can hereby be detected accurately, and the interruption can be adjusted thereto. The interruption takes place close to the highest and lowest positions of the guided movement of the buoyant body during the reciprocal movement of the medium.

The medium preferably performs a repetitive movement with a determined time duration (period), wherein the method further comprises of measuring the time period and the interruption lasts for at least 30% of the measured time period. During one stroke, i.e. during the descending or ascending movement of the medium, which has a time duration of half a period, the interruption thus lasts for 60% of this half period. In one embodiment the interruption lasts for about 40% of this half period. This was found by experimenting. This depends on the ratio of weight of the follower and height of the wave.

The interruption is preferably performed twice during the determined time period of the movement. The movement is hereby interrupted close to the highest and lowest position. This increases efficiency.

The method according to the invention further comprises of converting energy by pumping a fluid with the followed movement by supplying and discharging this fluid. A propeller can for instance hereby be driven, similarly to said European application.

In one embodiment a fluid is however pumped in that fluid is drawn in during the first stroke of the movement of the medium and is pumped out on the second stroke.

The interruption in the following of the movement of the first medium preferably comprises of closing the feed and discharge of the fluid. Because the pumped fluid cannot flow away, for instance because the discharge and feed valves are closed, the follower is preferably held in the position prevailing at that moment. The follower cannot follow the movement of the medium. Only when the feed or discharge is opened can fluid flow away and will the follower be able to move again and overtake the movement being made by the medium.

The invention also relates to a device for generating energy from a movement of a medium such as seawater, comprising a frame, guide means connected to the frame for guiding a movement in at least a vertical direction, at least one follower guided by the guide means for following the movement of the medium, and converting means for converting the movement of the follower into energy. The invention is characterized in that the device is provided with switch means for blocking the movement of the follower. The follower is hereby stopped while the medium, which is preferably swelling, moves further. When the switch means then release the follower, the follower will overtake the movement of the medium, wherein greater forces are generated and whereby the efficiency of the energy conversion is increased.

The switch means are preferably adapted to block the follower close to the extreme values of the movement. The medium and the follower perform a repetitive movement, for instance a wave movement. This has a crest and a trough. The least efficient energy conversion points are just close to the crest and the trough. The movement of the follower, which follows the height of the wave, is smallest (the speed is lowest) close to the crests and troughs of this followed wave. In addition, the wave falls with an acceleration which is less than the force gravity. When the follower is held in the highest position, whereafter the wave descends and the follower is released later, the follower will overtake the descending wave. The acceleration is here greater than when the follower follows the wave directly. This results in greater forces. By controlling the deceleration/interruption in effective manner the follower can in addition be accelerated such that it moves beyond the extreme value of the wave.

Detecting means are preferably arranged on the frame for the purpose of detecting the movement of the follower or the medium and a control device coupled to the detecting means and the switch means for the purpose of controlling the switch means on the basis of the detections of the detecting means. The detection of the detecting means, for instance whether the follower or the medium are situated close to the extreme values, can hereby play a part in the switching of the switch means for interrupting S the subsequent movement. The interruption period is a percentage of the measured period. The period is preferably a weighted average of the last-measured wave cycles.

In one embodiment the follower is or comprises a float. When held in a lower position while the medium is rising, a float will be exposed to an ever increasing buoyant force because of the volume of the medium displaced, and this force can be converted into work and energy by means of the converting means. An increased efficiency is hereby achieved.

In one embodiment the device comprises a feed conduit and a discharge conduit which are arranged on the frame and provided respectively with an inlet valve and an outlet valve, wherein a pump chamber is arranged between feed and discharge, wherein the pump chamber comprises a pump part which is movable relative to the frame and which can be connected to a float. The pump part, optionally with the float, forms the follower. The pump part will follow the movement of the medium, whereby the pump chamber is made larger and smaller. When the pump chamber is made larger the feed is open and when the pump chamber is made smaller the discharge is open. Fluid is hereby pumped through the conduits, wherein the pumping action can be used to generate energy. A turbine can for instance be used for this purpose. The inlet valve is closed during the pumping action of the pump. The outlet valve is closed during the suction action of the pump. These can for instance be one-way valves.

In another embodiment a ball valve is used. The valve can be operated by means of a magnet or coil or by means of a rack.

Figure 4:
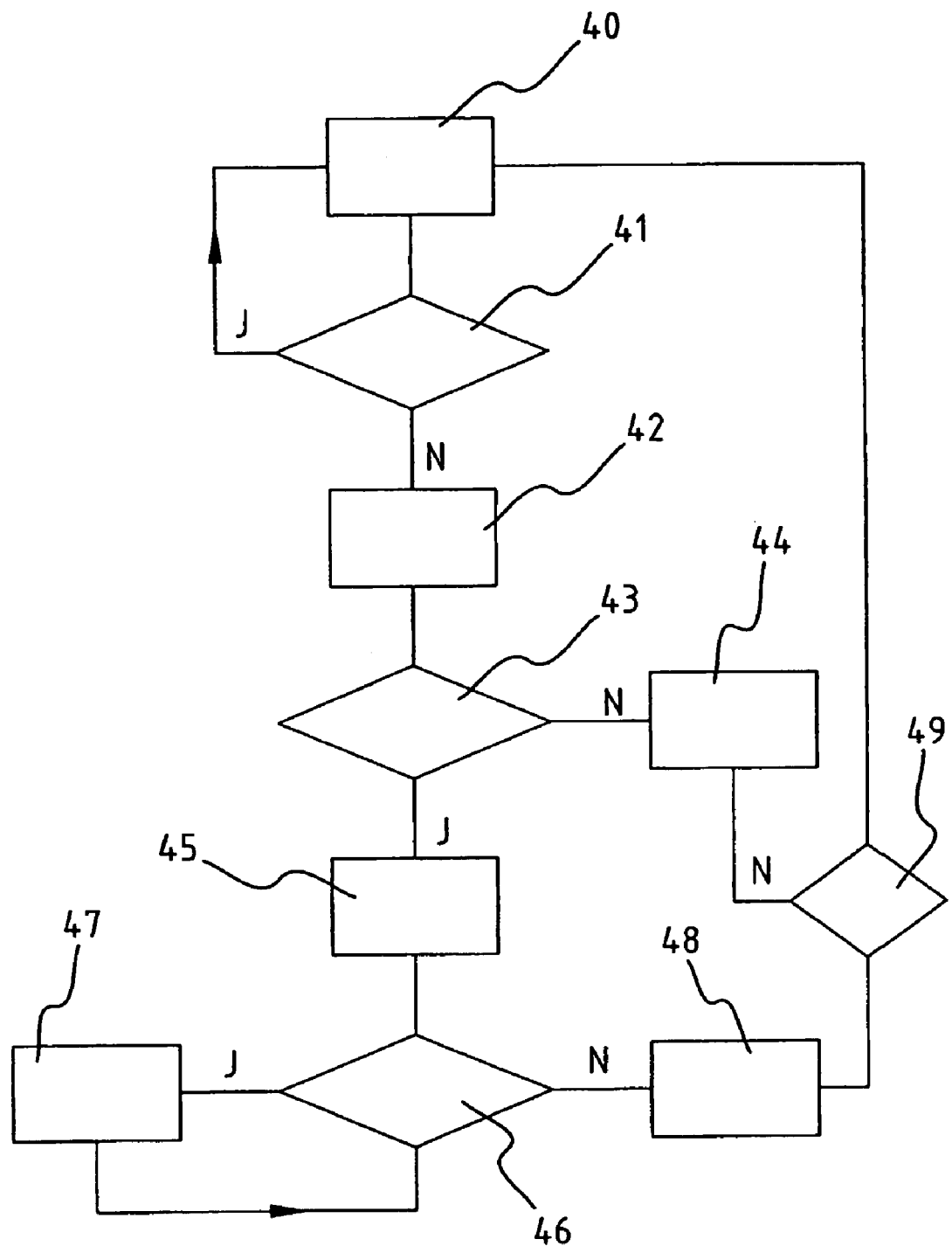
Figure 5:
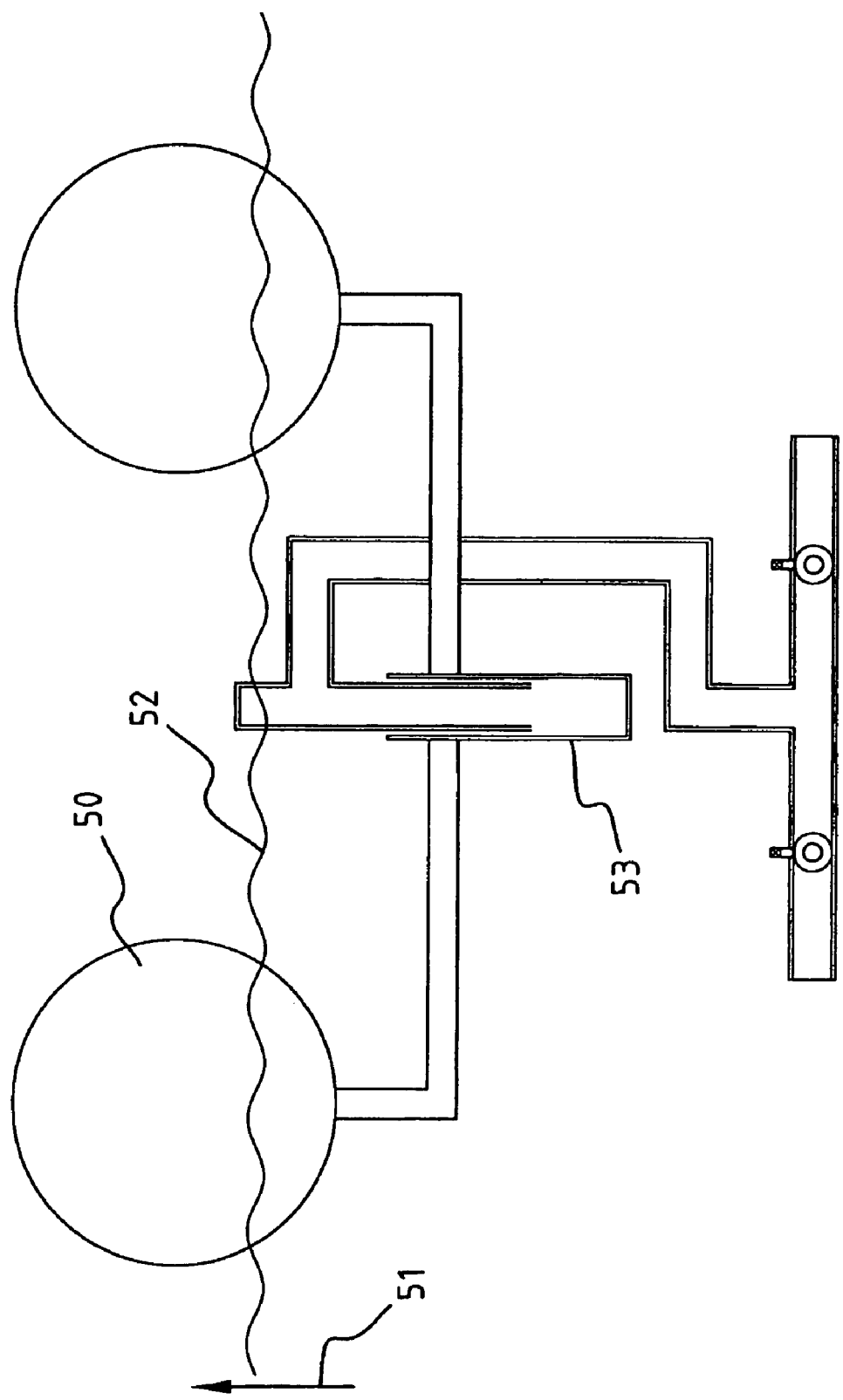
Figure 6:
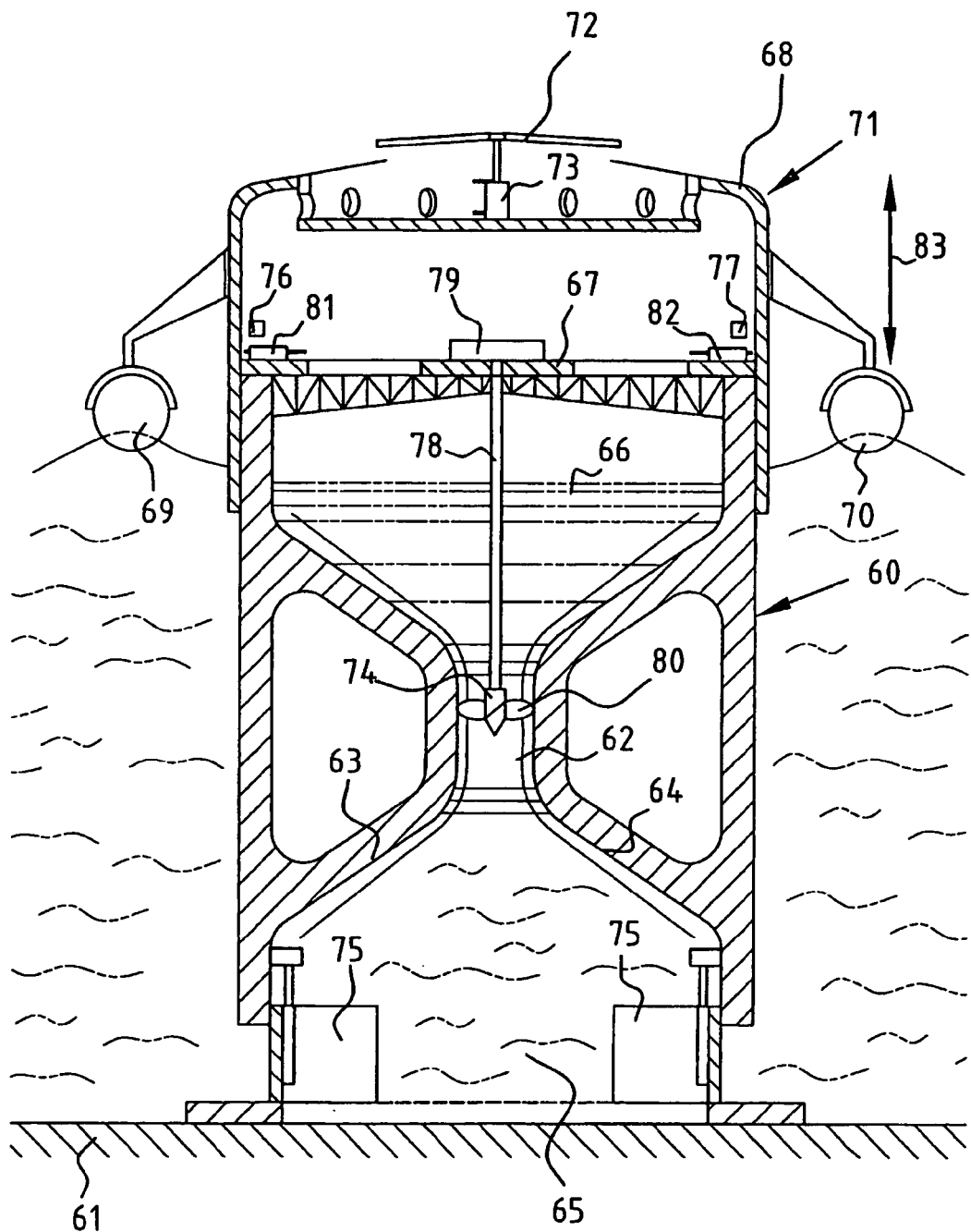
Figure 7:
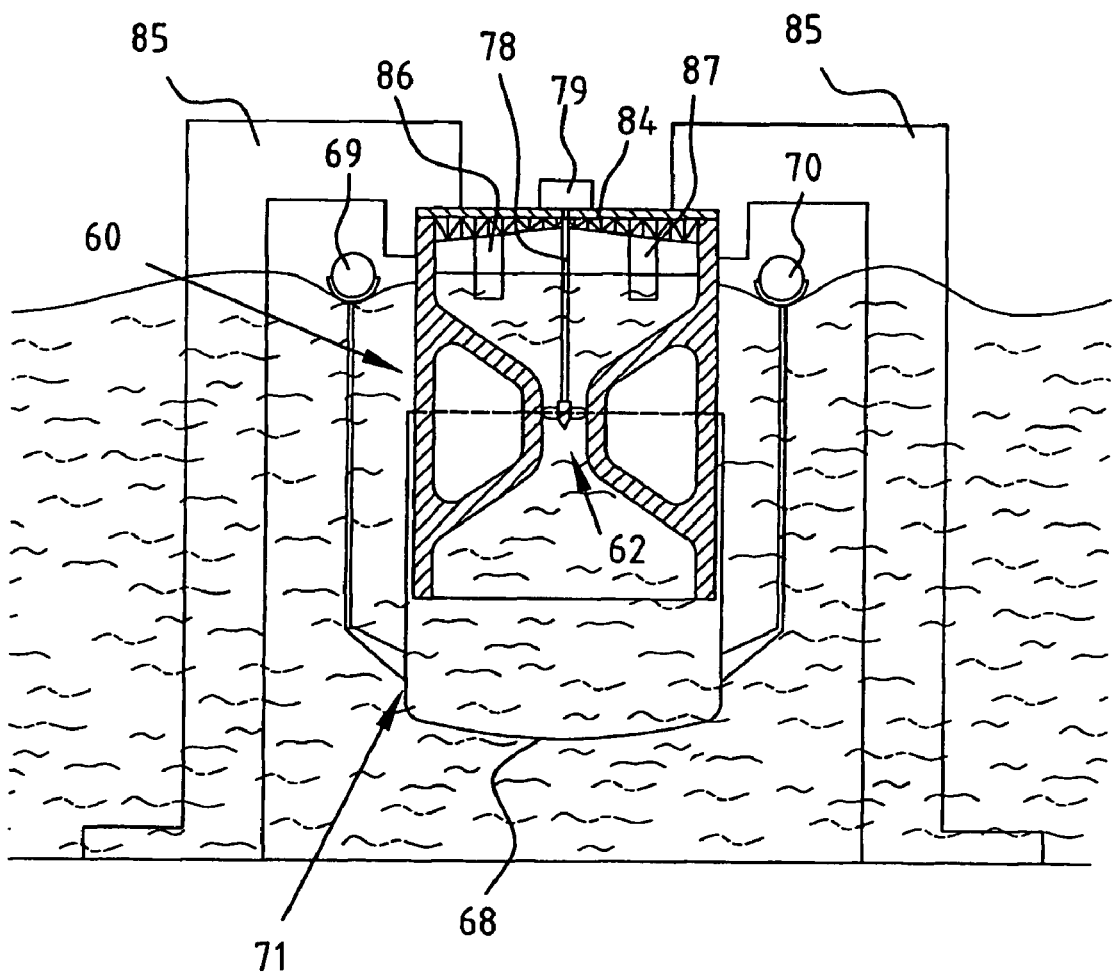
Figure 8:
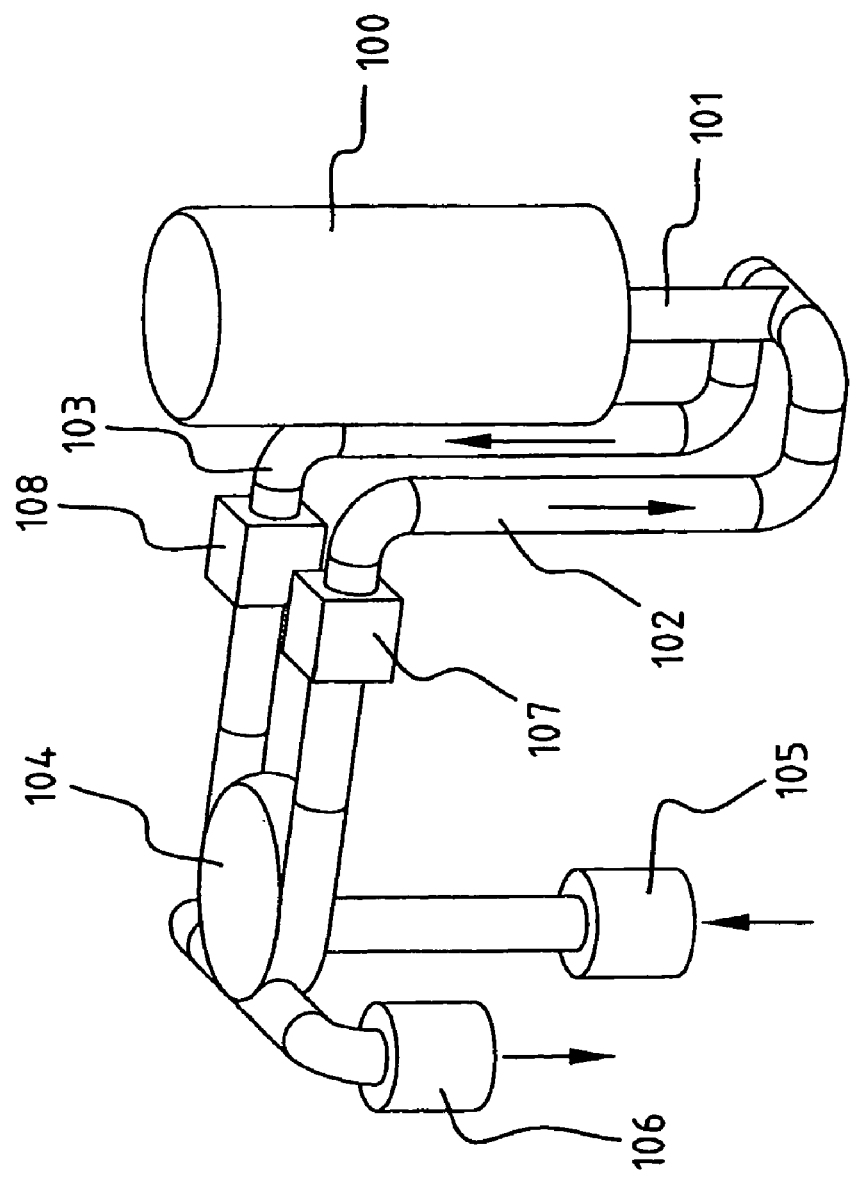
Figure 9:
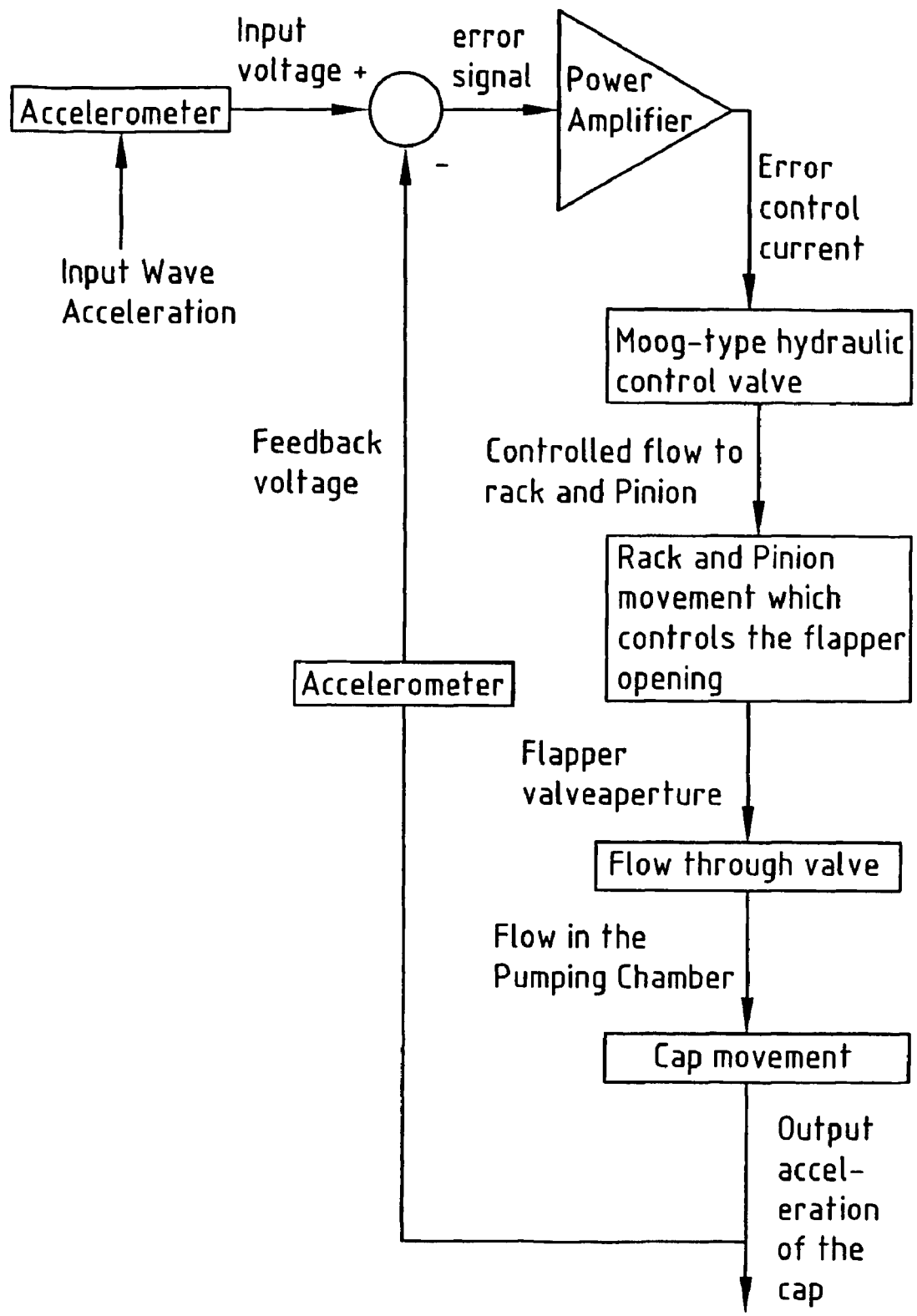

The invention will be further described with reference to the annexed drawings, in which:

FIG. 1 shows a schematic view of an energy generating device according to a first embodiment, FIG. 2 shows a schematic view of a wave, FIGS. 3A-D show schematically the movement of the energy generating device according to the first embodiment, FIG. 4 shows a flow diagram of the operation of a second embodiment of the energy generating device according to the invention, FIG. 5 shows a third embodiment of the energy generating device according to the invention, FIG. 6 shows a fourth embodiment of the energy generating device according to the invention, FIG. 7 shows a fifth embodiment of the energy generating device according to the invention, FIG. 8 shows a sixth embodiment of the energy generating device according to the invention, and FIG. 9 shows a block diagram of a control for controlling the energy generating device.

FIG. 1 shows the water level 1. A part of energy generating device 2 is arranged in the water. The part is shown which, under the influence of swelling in water level 1, will cause a pumping action which can be used for energy generation. Not shown is for instance a turbine, which will ultimately be used to convert the pumping action of the shown part of FIG. 1 into for instance electrical energy. The skilled person will be able to apply different energy generating means in suitable manner on the basis of the operation of the shown exemplary embodiments.

Energy generating device 2 has a fixedly arranged frame 3, for instance fixedly connected to the seabed. This comprises a supply tube 4, a discharge tube 5 and a substantially vertically standing conduit 6. The tubes are connected to a fluid source, for instance water. Through the action of energy generating device 2 water will be pumped, drawn in via feed 4 and pumped out via discharge 5. A turbine is for instance coupled to discharge 5 for the actual generation of energy.

Together with cover 7 tube 6 forms pump chamber 8. Cover 7 can slide over the standing outer end of conduit 6. Movement herein takes place as according to arrow 9. The standing tube 6 has a 63 mm outer diameter of plastic and the sliding cover has for instance a thin stainless steel wall with a 75 mm inner diameter. In order to allow the two parts to slide over each other without too much friction occurring therein, a brass collar 10 can for instance be arranged close to the outer end of tube 6. This can be connected thereto by means of an adhesive. A sliding fitting is hereby formed for the stainless steel cover.

According to another embodiment, the standing tube 6 is also a stainless steel pipe too with an inner diameter of 50 mm and a 65 mm outer diameter. Both pipes have a length of for instance 500 mm. The inner diameter of the outer pipe is drilled so that it obtains a smooth finish and the outer diameter of the inner pipe is ground with a precision cylindrical grinder so that a sliding fitting (i.e. 0.1 mm clearance/tolerance) between the pipes is obtained. Blocking and leakage are hereby minimized.

Two floats 13, 14 are connected to cover 8 via two rigid rods 11, 12. These float in and on water level 1. When the water level rises, for instance in a wave, the floats will be moved upward whereby cover 7 is moved upward as according to arrow 9, and pump chamber 8 is enlarged. In a wave trough the opposite occurs.

A valve 15 is arranged in supply tube 4 and a valve 16 in discharge tube 5. These are for instance two non-return valves, more in particular ball valves. In conduit 4 is arranged a ball with a continuous recess which can be rotated through 90 on a shaft, for instance by means of a toothed wheel and rack, wherein the rack is connected to a cylinder which can be controlled, for instance magnetically. The feed and/or the discharge can hereby be closed.

Valves 15, 16 are actively regulated valves which can be switched, i.e. opened or closed, at determined times. It is also possible to not only regulate for open or closed, but also for the size of the passage (see below). The determined times at which switching takes place depend on the wave cycle.

The energy generating device of FIG. 1 can be designated as a so-called T-piece.

The control of valves 15, 16 can be connected to a control device (not shown). The valves can hereby be controlled. In the shown embodiment the valves are arranged under the water level, but it is possible to remove these valves further from the pump chamber and optionally arrange them above water level.

In another embodiment the valves can be accommodated in a water-free space. In one embodiment seawater is fed in situ into tube 4. A separate medium feed is hereby unnecessary. In another embodiment a suitable compression fluid is used. This can for instance be distilled water.

The operation of the device of FIG. 1 will now be explained with reference to FIGS. 2 and 3.

FIG. 2 shows the water level at the position of floats 13, 14 as a function of time. The X-axis shows the time and the Y-axis shows the amplitude. In a calm sea the water level will be zero. FIG. 2 shows four moments A, B, C, D, at which the positions of the T-piece of FIG. 1 in FIGS. 3A-3D are shown. Location A is at the trough of the wave, location B is designated with T in FIG. 2 after roughly 35% of a cycle time, location C is at the crest of the wave and location D is about 80% of the cycle time.

FIG. 3A shows the situation of a simplified embodiment of the T-piece of FIG. 1. Float 20 lies at water level 21 which is situated below zero level 22 of the water surface. This is an extreme value. Pump chamber 23 is reduced in size and cover 24 is moved down to the maximum as according to arrow 25 over the vertical tube part 26 of the energy generating device. Valves 27, 28 in feed 29 and discharge 30 respectively are closed, indicated with the hatching. After the situation of FIG. 3A, the water level 21 will rise as according to arrow 31. Because valves 27 and 28 are closed, no fluid can flow into pump chamber 23 and the float will be held in the present position. This is shown in FIG. 3B. The float has not yet moved upward, while the water level 32 has meanwhile risen above zero level 22. Valve 27 is opened at moment B, whereby fluid can flow via feed tube 29 into pump chamber 23. Float 20 is in fact released and will move as according to arrow 33. The float feels a buoyant force which has built up between moments A and B in response to the water volume displaced by the floats. In this embodiment the buoyant force is proportional to the volume of the float and the density of the water, as well as the weight of the float and cover 24. The float and cover 24 will move in accelerated manner, wherein the acceleration decreases each time in response to the constantly decreasing buoyant force resulting from the decreasing displaced volume. The situation according to FIG. 3C will eventually be reached. Due to the inertia thereof, it is possible for the float to jump out above the level of the wave. The floats can have a streamlined form, whereby the resistance during movement through the medium is reduced.

FIG. 3C shows the water level 34 which is maximal and float 20 which has moved above this water level in response to the acceleration as generated between moments B and C. The movement of the float is interrupted at the highest point. The highest point can be detected with a detector 35, which in the embodiment of FIG. 3C is fixed to cover 24. Detector 35 can for instance measure the relative speeds of cover 24 relative to pipe 26. Detector 35 is for instance connected electrically to the control device. Close to the turning point, or the extreme value, valve 27 will be closed. This is shown in FIG. 3C. Float 20 and cover 24 will remain in the highest position, while water level 34 drops back to a lowest value as shown in FIG. 3A.

FIG. 3D shows that pump chamber 23, which had obtained a maximum volume in FIG. 3C, becomes smaller after opening of valve 28. The fluid collected in pump chamber 23 is pumped via discharge 30. The pressure and/or kinetic energy occurring here can be used in suitable manner to generate energy. The skilled person will here be able to make use of the devices available.

The float and cover 24 will move downward according to arrow 36, being accelerated here by the gravitational field.

FIG. 4 shows the algorithm for the control device (not shown) connected to detector 35, valve 27 and valve 28. In one embodiment the time of a wave cycle is measured. This can be calculated on the basis of the detections of detector 35. The calculated period preferably depends mainly on the last-measured period. Inlet valve 27 is opened at 40. The part coupled to the drive shaft then moves upward. At 41 the question is asked whether the float plus cover is still moving upward. If this is the case, the situation at 40 is maintained. If this is not the case, the algorithm will continue in step 42, wherein the inlet is closed. The highest point is reached. The process is then continued in step 43, in which use is for instance made of a timer. In step 43 a check is made as to whether the timer has expired yet. If this is not the case, step 44 will cause the timer to count down further. If this is however the case, the process will continue in step 45. Timer 44 is set to a percentage of the measured cycle time of the wave. This can be a percentage of the whole cycle time T according to FIG. 2 or of half the cycle time. The timer preferably depends on half the cycle time of the wave which has just taken place, the duration of which was equal to the time between the two moments of reversal of the movement. In another embodiment averages are taken. The timer counts down to a percentage of the whole period or half the cycle time. When half the cycle time is used, the timer is set to about 80% of half the cycle time (or 40% of the total cycle time).

Extensive experiments have been carried out in order to determine that the delay built in by the timer must lie between 25% and 45% of the cycle time, preferably between 30% and 43%, and in a preferred embodiment between 35% and 42% of the total cycle time.

When it is detected in step 43 that the timer has expired, the process will continue in step 45, wherein the outlet valve is opened. This is in fact a moment somewhere between the situations shown in FIGS. 3C and 3D. Outlet 28 remains opened according to step 45 until it is detected in step 46 that the float body and cover are no longer moving downward. The question is asked in step 46 whether the float is still moving downward, wherein step 47. indicates that this is still the case and continues without any change being made, for instance by changing the situation behind the valves, while step 48 is reached when the floats are not moving downward any further. In step 48 the outlet valve will be closed. Step 49 will ask whether the timer has already counted down. If this is not the case, the timer will continue counting down as according to step 44. If this is however the case, a return will be made to step 40. The cycle is hereby repeated.

In one embodiment particular safety precautions can be incorporated, for instance detectors which report the water level and check on the basis thereof whether the algorithm is in the correct step. when the water level is rising, the algorithm must always be in steps 48 and 49. The skilled person will be able to make electrical connections in suitable manner to the control device.

FIG. 5 shows a third embodiment. The device according to FIG. 5 is comparable in many ways to FIG. 1, although cover 53 will move upward when floats 50 move upward as according to arrow 51 during a wave in water surface 52. Because the buoyant force depends on the volume of the floats, use is made here of this buoyant force in the pumping stroke.

In another embodiment the turbines can be arranged either in the feed or in the discharge of the energy generating device.

FIG. 6 shows a fourth embodiment, which is known from EP-A-1007843.

The shown device comprises a hollow body. Inside hollow body 60 a narrow passage 62 is arranged between the inward protruding parts 63, 64. Two spaces 65, 66 are arranged on both sides of passage 62. The top 67 of hollow body 60 is covered with a cap 68 which is connected to floating elements 69, 70. Buoyant body 71 comprises cap 68 and floating elements 69, 70. The cap can be closed by means of a lid 72. Lid 72 is movable by means of actuating means 73, for instance pneumatic means, in order to vent the trapped air to the atmosphere. For resonance purposes the lid 29 is closed only when the movement of the outside seawater level is in the same direction as, and is faster than, the seawater level inside body 60. During the movement of the waves, which is transmitted to lid 72 by floating elements 69, 70, the lid 72 moves up and downward, whereby air is enclosed between lid 72 and the seawater level inside body 60, which is compressed and expanded so that the column of seawater will flow through passage 62 and turbine 74, wherein this latter is driven. Lid 72 can be closed and opened in order to regulate the volume of air inside hollow body 60.

Closable openings 75 are arranged on the lower side of hollow body 60. The length of the liquid column inside hollow body 60 can hereby be adjusted so that the natural frequency can be adjusted to the frequency of movement of the seawater.

In the lid are arranged sensors 76, 77 for measuring the speed of the movement of the lid relative to the upper surface of the water column.

The turbine according to this embodiment comprises fan 80 connected to a shaft 78 on generator 79. Blocking means 81, 82 are arranged and can engage, for instance by clamping or by being accommodated in a recess, on cap 68. When the pins of blocking means 81, 82 engage, the cap will be unable to move as according to arrow 83. While a swell of the sea water takes place, the floats will not follow this swell because cap 68 cannot move. When, at a favourable moment, sufficient force has been developed, the blocking by 81 and 82 is released and the cap will still overtake the movement of the sea. An increased efficiency of turbine 79 is hereby achieved.

Yet another embodiment is shown in FIG. 7. This figure shows lid 68 and hollow body 60. In this embodiment the generator 79 is arranged on upper side 84 of hollow body 60 and lid 68 is moved from below. In this case the hollow body 60 is supported by feet 85. Water can enter the top side of hollow body 60 freely via openings 86, 87 which are situated just below the sea water level at the lowest tide.

Other devices, such as the device known from WO 0214687, can also be provided with controllable valve means for making the up or downward stroke more effective.

FIG. 8 shows another embodiment of a device for the conversion of energy from movement of sea water. The device comprises a float 100 which is formed in a manner such that it provides a sliding fit with a pump chamber 101. Float 100 can be moved freely up and downward, which results in the volume of pump chamber 101 being made larger and smaller. Pump chamber 101 is connected to a supply tube 102 and a discharge tube 103. Both tubes 102, 103 are connected at their other ends to a turbine 104. Turbine 104 has an inlet 105 and an outlet 106 in communication with a large quantity of water, for instance the sea. An inlet valve 107 is moreover provided in supply tube 101, while an outlet valve 108 is provided in discharge tube 103.

Float 100 will want to move up and downward under the influence of the wave action. Float 100 can however be held in place by switching the valves 107, 108. The operation is as follows. When the water is in its lower trough, valves 107, 108 are closed by PLC (Programmable Logic Controller). The water begins to rise and thus causes a negative pressure in pump chamber 101. This negative pressure will increase in proportion to the rising of the water. Inlet valve 107 is opened at a suitable moment in time during rising of the water. Water is thus drawn in through inlet 105 and into turbine 104, whereby the turbine will begin to rotate in counter-clockwise direction. When the water leaves turbine 104, it is drawn into pump chamber 101 via supply tube 102.

Inlet valve 107 will once again be closed when the water is at its peak. The water begins to fall and, because outlet valve 108 is still closed, this will cause a positive pressure in pump chamber 101. This positive pressure will increase in proportion to the drop in the water level. Outlet valve 108 is opened at a suitable moment in time during subsiding of the water. Water is thus pressed through discharge tube 103 and turbine 104, whereby the latter will begin to rotate as above in counter-clockwise direction. The water leaves turbine 104 via outlet 106.

It is possible to also have control valves in inlet 105 and outlet 106. The control valve in inlet 105 is opened (or closed) simultaneously with opening (or closing) of valve 107 in supply tube 102. The control valve in outlet 106 is opened (or closed) simultaneously with opening (or closing) of valve 108 in discharge tube 103.

Turbine 104 is driven during both strokes of the wave pump, i.e. during the downward and the upward stroke of float 100.

FIG. 9 shows a block diagram for control of the valves in the supply and discharge tubes of the wave pump, for instance the wave pump as shown in FIG. 1 or 8. Not only are opening or closing of the valves controlled, so that the following of the wave movement by the buoyant body will be interrupted, but the area of the valve passage can also be controlled. The damping of the whole wave pump system is inversely proportional to the area of the valve passage. The damping (or oscillation) of the buoyant body can be controlled by proportional adjustment of the opening (area) of the valves. In this way all manner of conditions can be taken into account, such as weather conditions, maximum permissible amplitude of the buoyant body, maximum desirable acceleration of the buoyant body, this being deemed desirable for increasing the safe movement of the large mass of the float. In this latter embodiment the valves are used not only for hydraulic locking of the buoyant body of the wave energy conversion system, but they are also used to regulate the movement of the cap which the system will develop during operation. The control valves will consist of a series of louvres or flappers which are each connected to pinions. A double-action hydraulic cylinder will be connected to a rack which will be brought into contact with all the pinions. The hydraulic cylinder will be activated by means of a Moog-type control valve which regulates the flow of oil in the hydraulic cylinder in accordance with an electrical current generated from an error signal. The opening of the flappers can therefore be placed under closed loop control. Accelerometers will convert the acceleration of the cap and the waves and be compared to each other to thus generate an error voltage. This error voltage will be amplified in a power amplifier in order to feed the correcting current to the Moog-type valve, as shown in the block diagram of FIG. 9.

The invention claimed is:

1. A method for generating energy from an undulating movement of a medium such as seawater, comprising the steps of:
    following the movement of the medium with a float, wherein a direction of movement of the movement changes at a point in time,
    converting the followed movement of the float into energy, and
    interrupting the following of the movement of the float close to said point in time,
    wherein the conversion of energy includes pumping a fluid with the followed movement of the float by feeding and discharging said fluid,
    further including regulating the movement of the float by closing the feed and/or discharge of the fluid and controlling the degree of closure of the feed and/or discharge of the fluid when the feed and/or discharge is not closed,
    wherein said degree of closure of the feed and/or discharge of the fluid is controlled by obtaining an acceleration signal from an accelerometer measuring the acceleration of the float and obtaining an acceleration signal from an accelerometer measuring the acceleration of the medium, and compare said two acceleration signals such that an error current is obtained, and using said error current to control said degree of closure of the feed and/or discharge of the fluid.

2. A device for generating energy from an undulating movement of a medium such as seawater, comprising a frame, guide means connected to the frame for guiding the movement in at least a vertical direction, at least one follower guided by the guide means for following the movement of the medium, and converting means for converting the movement of the follower into energy, wherein the device is provided with hydraulic switch means for blocking the movement of the follower wherein said switch means comprise hydraulic control valves, wherein said device further comprises an accelerometer arranged to measure the acceleration of the float, an accelerometer arranged to measure the acceleration of the medium, and a comparator for comparing the voltages of the two acceleration signals of said accelerometers and producing an error current, wherein said control valves are arranged to control the area of the valve passage when the valve is open and regulate the movement of the follower in accordance with said error current.

3. The device as claimed in claim 2, wherein the switch means are adapted to block the follower close to extreme values of the movement of the follower.

4. The device as claimed in claim 3, further comprising control means for controlling the followed movement of the follower, and wherein the control means control the position of the switch means.

5. The device as claimed in claim 2, further including detecting means arranged on the frame for the purpose of detecting the movement of the follower or the medium and a control device coupled to the detecting means and the switch means for the purpose of controlling the switch means on the basis of detections by the detecting means.

6. The device as claimed in claim 2, wherein the follower is a float or comprises a float.

7. The device as claimed in claim 2, further including a feed conduit and a discharge conduit which are provided respectively with an inlet valve and an outlet valve, wherein a pump chamber is arranged between feed and discharge, and wherein the pump chamber comprises a pump part which is movable relative to the frame.

8. The device as claimed in claim 7, wherein the pump part is connected to the follower.

9. The method as claimed in claim 1, further including detecting the change in the direction of movement and interrupting in response to the detection.

10. The method as claimed in claim 1, further including interrupting the movement twice during the wave cycle time period.

* * * * *